US010066387B2

(12) United States Patent
Hensley et al.

(10) Patent No.: US 10,066,387 B2
(45) Date of Patent: Sep. 4, 2018

(54) PRECOMPRESSED FOAM EXPANSION JOINT SYSTEM TRANSITION

(71) Applicant: Emseal Joint Systems, LTD, Westborough, MA (US)

(72) Inventors: Lester Hensley, Westborough, MA (US); Bill Witherspoon, Guelph (CA)

(73) Assignee: Emseal Joint Systems, Ltd., Westborough, MA (US)

( * ) Notice: Subject to any disclaimer, the term of this patent is extended or adjusted under 35 U.S.C. 154(b) by 0 days.

(21) Appl. No.: 14/950,930

(22) Filed: Nov. 24, 2015

(65) Prior Publication Data

US 2016/0208480 A1 Jul. 21, 2016

Related U.S. Application Data

(63) Continuation-in-part of application No. 12/635,062, filed on Dec. 10, 2009, now Pat. No. 9,200,437.

(60) Provisional application No. 61/121,590, filed on Dec. 11, 2008.

(51) Int. Cl.

*E04B 1/68* (2006.01)
*B29C 44/56* (2006.01)
*B29L 31/26* (2006.01)

(52) U.S. Cl.

CPC ........ *E04B 1/6812* (2013.01); *B29C 44/5618* (2013.01); *B29C 44/5627* (2013.01); *B29C 44/5681* (2013.01); *B29K 2995/0069* (2013.01); *B29L 2031/26* (2013.01)

(58) Field of Classification Search

CPC ......... E04D 11/02; E04D 13/151; E04B 1/68; E04B 1/6812; E04B 1/6815; E04B 1/948

See application file for complete search history.

(56) References Cited

U.S. PATENT DOCUMENTS

| | | | |
|---|---|---|---|
| 3,355,846 | A | 12/1967 | Tillson |
| 3,372,521 | A | 3/1968 | Thom |
| 3,551,009 | A | 12/1970 | Cammuso et al. |

(Continued)

FOREIGN PATENT DOCUMENTS

| | | | |
|---|---|---|---|
| CA | 2640007 | A1 | 3/2009 |
| DE | 19809973 | C1 | 7/1999 |

(Continued)

OTHER PUBLICATIONS

Polyurethane Foam Field Joint Infill Systems, Sep. 23, 2007 (via Snagit), PIH, pp. 1-4.

(Continued)

*Primary Examiner* — Elizabeth A Quast

(74) *Attorney, Agent, or Firm* — MKG LLC

(57) ABSTRACT

A water resistant expansion joint system includes foam, which has been formed into a desired shape by at least one of stamping, cutting, molding and die-cutting; and a layer of an elastomer disposed on the foam. The layer of the elastomer facilitates compression of the water resistant expansion joint system when installed between substrates. The desired shape of the foam includes an angle, and the water resistant expansion joint system is angled around a corner and accommodates thermal and seismic movement in the system by expanding and contracting, and creates a waterproof seal around the corner upon expansion of the foam between the substrates.

6 Claims, 6 Drawing Sheets

(56) References Cited

U.S. PATENT DOCUMENTS

| | | | |
|---|---|---|---|
| 3,670,470 | A | 6/1972 | Thom |
| 3,672,707 | A | 6/1972 | Russo et al. |
| 3,677,145 | A | 7/1972 | Wattiez |
| 3,934,905 | A | 1/1976 | Lockard |
| 3,956,557 | A | 5/1976 | Hurst |
| 4,058,947 | A | 11/1977 | Earle et al. |
| 4,362,428 | A | 12/1982 | Kerschner |
| 4,401,716 | A | 8/1983 | Tschudin-Mahrer |
| 4,455,396 | A | 6/1984 | Al-Tabaqchall et al. |
| 4,566,242 | A | 1/1986 | Dunsworth |
| 4,637,085 | A | 1/1987 | Hartkorn |
| 4,773,791 | A | 9/1988 | Hartkorn |
| 4,781,003 | A | 11/1988 | Rizza |
| 4,916,878 | A | 4/1990 | Nicholas |
| 4,942,710 | A | 7/1990 | Rumsey |
| 4,957,798 | A | 9/1990 | Bogdany |
| 5,094,057 | A | 3/1992 | Morris |
| 5,115,603 | A | 5/1992 | Blair |
| 5,130,176 | A | 7/1992 | Baerveldt |
| 5,213,441 | A | 5/1993 | Baerveldt |
| 5,249,404 | A | 10/1993 | Leek et al. |
| 5,327,693 | A | 7/1994 | Schmid |
| 5,335,466 | A | 8/1994 | Langohr |
| 5,338,130 | A | 8/1994 | Baerveldt |
| 5,365,713 | A | 11/1994 | Nicholas et al. |
| 5,450,806 | A | 9/1995 | Jean |
| 5,508,321 | A | 4/1996 | Brebner |
| 5,572,920 | A | 11/1996 | Kennedy et al. |
| 5,628,857 | A | 5/1997 | Baerveldt |
| 5,887,400 | A | 3/1999 | Bratek et al. |
| 5,935,695 | A † | 8/1999 | Baerveldt |
| 6,014,848 | A | 1/2000 | Hillburn, Jr. |
| 6,128,874 | A | 10/2000 | Olson et al. |
| 6,460,214 | B1 | 10/2002 | Chang |
| 6,491,468 | B1 | 12/2002 | Hagen |
| 6,499,265 | B2 | 12/2002 | Shreiner |
| 6,532,708 | B1 | 3/2003 | Baerveldt |
| 6,880,074 | B2 | 3/2005 | Stanchfield |
| 6,948,287 | B2 | 9/2005 | Korn |
| 7,114,899 | B2 | 10/2006 | Gass et al. |
| 7,240,905 | B1 | 7/2007 | Stahl, Sr. |
| 7,748,310 | B2 | 7/2010 | Kennedy |
| 7,941,981 | B2 | 5/2011 | Shaw |
| 8,171,590 | B2 | 5/2012 | Kim |
| 8,317,444 | B1 | 11/2012 | Hensley |
| 8,341,908 | B1 | 1/2013 | Hensley et al. |
| 8,365,495 | B1 | 2/2013 | Witherspoon |
| 2003/0110723 | A1 | 6/2003 | Baerveldt |
| 2006/0030227 | A1 | 2/2006 | Hairston et al. |
| 2008/0193738 | A1 | 8/2008 | Hensley et al. |
| 2010/0275539 | A1 | 11/2010 | Shaw |
| 2010/0319287 | A1 | 12/2010 | Shaw |
| 2012/0117900 | A1 | 5/2012 | Shaw |

FOREIGN PATENT DOCUMENTS

| | | | |
|---|---|---|---|
| DE | 102005054375 | A1 | 5/2007 |
| EP | 1118715 | A1 | 7/2001 |
| GB | 2377379 | A | 1/2003 |
| WO | 2007024246 | A1 | 3/2007 |

OTHER PUBLICATIONS

Emseal Joint Systems, Drawing 010-0-00-00, Dec. 6, 2005, 1 page.

Emseal Joint Systems, Techdata, Jun. 1997, 2 pages.

Snagit Capture Polyurethane Foam Field Joint Infill Systems, Sep. 23, 2007, 1 page.

Emseal Joint Systems, Drawing SJS-100-CHT-N, Nov. 20, 2007, 1 page.

Emseal Technical Bulletin, Benchmarks of Performance for High-Movement Acrylic-Impregnated, Precompressed, Foam Sealants When Considering Substitutions, Jul. 3, 2012, 4 pages.

Emseal Material Safety Data Sheet, Apr. 2002, 2 pages.

Emseal, Is There a Gap in Your Air Barrier Wall Design?, Jul. 19, 2012, 3 pages.

Emseal, "Pre-cured-Caulk-And_Backerblock" Not New, Not Equal to Emseal's Colorseal, Jul. 19, 2012, 3 pages.

Emseal, Colorseal & Seismic Colorseal, May 1997, Install Data Colorseal & Seismic Colorseal, p. 1-2.

Manfredi, Liliana; et al. "Thermal degradation and fire resistance of unsaturated polyester, modified acrylic resins and their composites with natural fibres" Polymer Degradation and Stability 91; 2006; pp. 255-261.

Stein, Daryl et al. "Chlorinated Paraffins as Effective Low Cost Flame Retardants for Polyethylene" Dover Chemical Corporation, 9 pages.

Emseal Joint Systems, Ltd., Install Data—Horizontal Colorseal—With Expoxy Adhesive, Jun. 2006, 2 pages.

Emseal Corporation, Seismic Colorseal by Emseal, "Last Modified": Aug. 21, 2007, 4 pages.

Emseal Joint Systems, Ltd., Backerseal (Greyflex), Sep. 2001, 2 pages.

Emseal Joint Systems, Ltd., Horizontal Colorseal TechData, 2 pages, Jun. 1997, Emseal Joint Systems, Ltd., USA.†

Emseal Corporation, Seismic Colorseal by Emseal, Aug. 21, 2007, 4 pages, USA.†

Emseal Joint Systems, Ltd., Install Data—Horizontal Colorseal—with Epoxy Adhesives, 2 pages, Jun. 1997, Emseal Joint Systems, Ltd., USA.†

Emseal USA, Inc., Colorseal Tech Data Jan. 2000, 2 pages, Jan. 2000, Emseal Joint Systems, Inc., Westborough, Massachusetts, USA.†

Lester Hensley, Where's the Beef in Joint Sealants? Hybrids Hold the Key, 5 pages, Spring 2001, The Applicator vol. 23, No. 2, SWR Institute, Kansas City, Missouri.†

† cited by third party

PRECOMPRESSED FOAM EXPANSION JOINT SYSTEM TRANSITION

CROSS REFERENCE TO RELATED APPLICATIONS

This application is a continuation-in-part (CIP) application of U.S. Non-Provisional patent application Ser. No. 12/635,062, filed on Dec. 10, 2009, now U.S. Pat. No. 9,200,437, which claims the benefit of U.S. Provisional Patent Application No. 61/121,590, filed on Dec. 11, 2008, the contents of each of which are incorporated herein by reference in their entireties.

TECHNICAL FIELD

The present invention relates generally to joint systems for use in concrete and other building systems and, more particularly, to expansion joints for accommodating thermal and/or seismic movements in such systems.

BACKGROUND OF THE INVENTION

Concrete structures and other building systems often incorporate joints that accommodate movements due to thermal and/or seismic conditions. These joint systems may be positioned to extend through both interior and exterior surfaces (e.g., walls, floors, and roofs) of a building or other structure.

In the case of an exterior joint in an exterior wall, roof, or floor exposed to external environmental conditions, the expansion joint system should also, to some degree, resist the effects of the external environment conditions. As such, most external expansion joints systems are designed to resist the effects of such conditions (particularly water). In vertical joints, such conditions will likely be in the form of rain, snow, or ice that is driven by wind. In horizontal joints, the conditions will likely be in the form of rain, standing water, snow, ice, and in some circumstances all of these at the same time. Additionally, some horizontal systems may be subjected to pedestrian and/or vehicular traffic.

Many expansion joint products do not fully consider the irregular nature of building expansion joints. It is common for an expansion joint to have several transition areas along the length thereof. These may be walls, parapets, columns, or other obstructions. As such, the expansion joint product, in some fashion or other, follows the joint as it traverses these obstructions. In many products, this is a point of weakness, as the homogeneous nature of the product is interrupted. Methods of handling these transitions include stitching, gluing, and welding. In many situations, it is difficult or impossible to prefabricate these expansion joint transitions, as the exact details of the expansion joint and any transitions and/or dimensions may not be known at the time of manufacturing.

In cases of this type, job site modifications are frequently made to facilitate the function of the product with regard to the actual conditions encountered. Normally, one of two situations occurs. In the first, the product is modified to suit the actual expansion joint conditions. In the second, the manufacturer is made aware of issues pertaining to jobsite modifications, and requests to modify the product are presented to the manufacturer in an effort to better accommodate the expansion joint conditions. In the first situation, there is a chance that a person installing the product does not possess the adequate tools or knowledge of the product to modify it in a way such that the product still performs as designed or such that a transition that is commensurate with the performance expected thereof can be effectively carried out. This can lead to a premature failure at the point of modification, which may result in subsequent damage to the property. In the second case, product is oftentimes returned to the manufacturer for rework, or it is simply scrapped and re-manufactured. Both return to the manufacturer and scrapping and re-manufacture are costly, and both result in delays with regard to the building construction, which can in itself be extremely costly.

SUMMARY OF THE INVENTION

The present invention is directed to water resistant expansion joint systems for installation into building joints. In one aspect, the present invention resides in a system for use in vertical or horizontal configurations and is designed such that it can be used for either an inside or outside corner. The system comprises open celled foam having a water-based acrylic chemistry infused therein. A layer of an elastomer is disposed on the open celled foam and is tooled to define a profile to facilitate the compression of the expansion joint system when installed between coplanar substrates. The system is delivered to a job site in a pre-compressed state ready for installation into the building joint.

In another aspect, the present invention resides in a vertical expansion joint system comprising a first section of open celled foam extending in a horizontal plane and a second section of open celled foam extending in a vertical plane. An insert piece of open celled foam is located between the first and second sections, the insert piece being configured to transition the first section from the horizontal plane to the vertical plane of the second section. The foam is infused with a water-based acrylic chemistry. A layer of an elastomer is disposed on the foam to impart a substantially waterproof property thereto. The vertical expansion joint system is pre-compressed and is installable between horizontal coplanar substrates and vertical coplanar substrates. Although the vertical expansion joint system is described as having an angle of transition from horizontal to vertical, it should be understood that the transition of the angles is not limited to right angles as the vertical expansion joint system may be used to accommodate any angle.

In another aspect, the present invention resides in a horizontal expansion joint system, the system being pre-compressed and installable between horizontal coplanar substrates. The system comprises first and second sections of open celled foam extending in a horizontal plane, the sections being joined at a miter joint. The open celled foam is infused with a water-based acrylic chemistry. A layer of an elastomer is disposed on the foam, the elastomer imparting a substantially waterproof property to the foam. Although the horizontal expansion joint system is described as transitioning right angles in the horizontal plane, it should be understood that the transition of the angles is not limited to right angles as the system may be used to accommodate any angle and may also be used in planes that are not horizontal.

In any embodiment, the construction or assembly of the systems described herein is generally carried out off-site, but elements of the system may be trimmed to appropriate length on-site. By constructing or assembling the systems of the present invention in a factory setting, on-site operations typically carried out by an installer (who may not have the appropriate tools or training for complex installation procedures) can be minimized. Accordingly, the opportunity for an installer to effect a modification such that the product does not perform as designed or such that a transition does not meet performance expectations is also minimized.

DETAILED DESCRIPTION OF THE PREFERRED EMBODIMENTS

The present invention provides a resilient water resistant expansion joint system able to accommodate thermal, seismic, and other building movements while maintaining water resistance characteristics. The present invention is especially suited for use in concrete buildings and other concrete structures including, but not limited to, parking garages, stadiums, tunnels, bridges, waste water treatment systems and plants, potable water treatment systems and plants, and the like.

Figure 1:
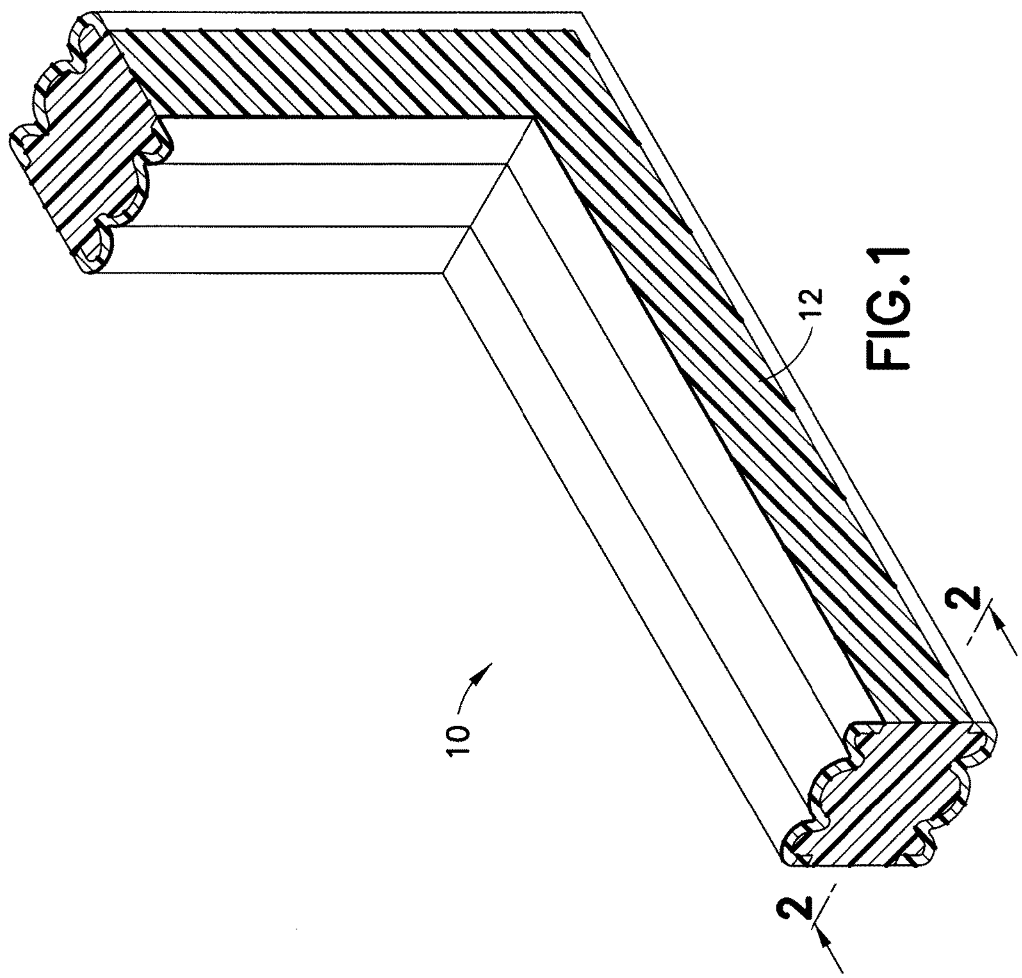
FIG. 1 is a perspective view of a vertical expansion joint system of the present invention.
Figure 2:
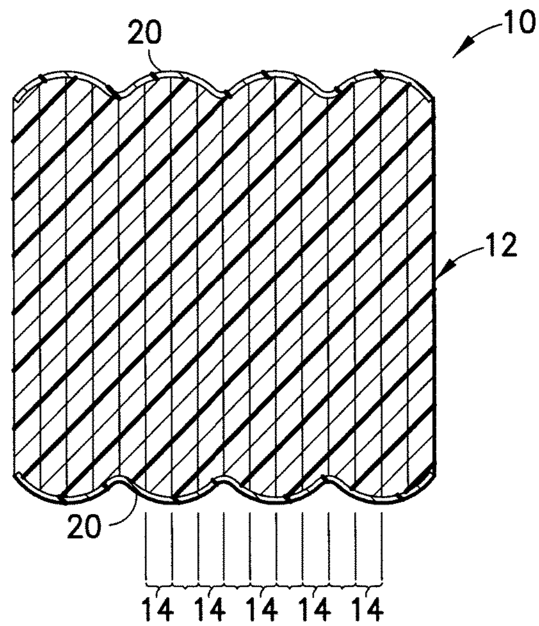
FIG. 2 is an end view of the vertical expansion joint system taken along line 2-2 of FIG. 1.
Figure 3:
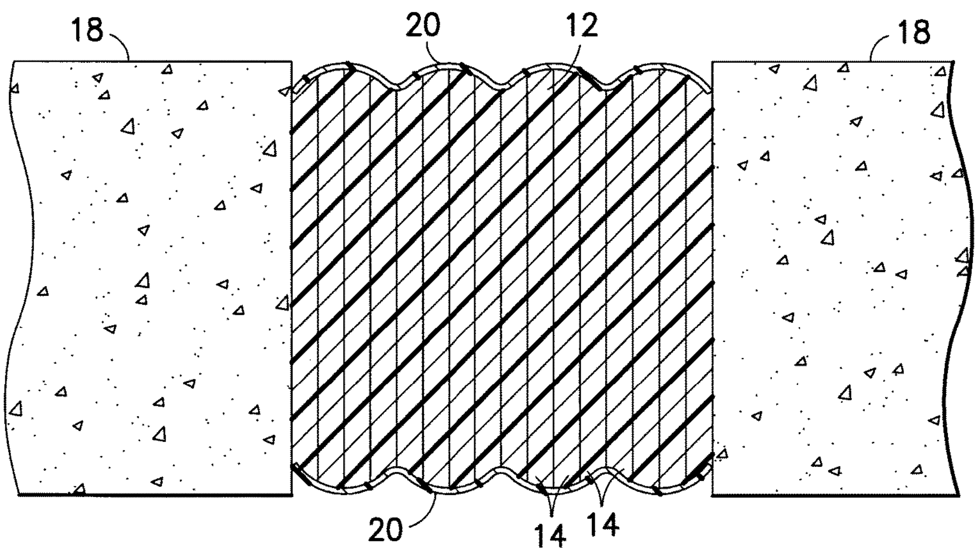
FIG. 3 is an end view of the vertical expansion joint system installed between two substrates.

Referring now to FIGS. 1-3, one embodiment of the present invention is an expansion joint system oriented in a vertical plane and configured to transition corners at right angles. This system is designated generally by the reference number 10 and is hereinafter referred to as "vertical expansion joint system 10." It should be noted, however, that the vertical expansion joint system 10 is not limited to being configured at right angles, as the products and systems of the present invention can be configured to accommodate any desired angle. The vertical expansion joint system 10 comprises sections of foam, e.g., open celled polyurethane foam 12 (hereinafter "foam 12") that have been infused with a hydrophobic chemistry. Non-limiting examples of a hydrophobic chemistry include a water-based acrylic chemistry, a water resistant chemistry, combinations thereof and so forth.

Additionally, it is noted that the term "infused with" as used throughout the descriptions herein is meant to be broadly interpreted to refer to "includes" or "including." Thus, for example, a "foam infused with a hydrophobic chemistry" covers a "foam including a hydrophobic chemistry" in any form and amount, such as a layer, and so forth. Accordingly, as used herein, the term "infused with" would also include, but not be limited to, more particular embodiments such as "permeated" or "filled with" and so forth.

It should be understood, however, that although the present invention is described as preferably comprising open celled polyurethane foam, the foam can be any other suitable type of foam.

As is shown in FIG. 2, the foam 12 comprises individual laminations 14 of foam, one or more of which are infused with a suitable amount of the hydrophobic chemistry, such as an acrylic chemistry. It should be noted that the present invention is not so limited as other manners of constructing the foam 12 are also possible. For example, the foam 12 of the present invention is not limited to individual laminations 14 assembled to construct the laminate, as the foam 12 may comprise a solid block of non-laminated foam of fixed size depending upon the desired joint size, laminates comprising laminations oriented horizontally to adjacent laminations, or combinations of the foregoing.

Also as is shown in FIG. 3, the vertical expansion joint system 10 is positionable between opposing substrates 18 (which may comprise concrete, glass, wood, stone, metal, or the like) to accommodate the movement thereof. In particular, opposing vertical surfaces of the foam 12 are retained between the edges of the substrates 18. The compression of the foam 12 during the installation thereof between the substrates 18 enables the vertical expansion system 10 to be held in place.

In any embodiment, when individual laminations 14 are used, several laminations, the number depending on the expansion joint size (e.g., the width, which depends on the distance between opposing substrates 18 into which the vertical expansion system 10 is to be installed), are compiled and then compressed and held at such compression in a fixture. The fixture, referred to as a coating fixture, is at a width slightly greater than that which the expansion joint will experience at the greatest possible movement thereof.

In the fixture, the assembled infused laminations 14 are coated with a waterproof elastomer 20. The elastomer 20 may comprise, for example, at least one polysulfide, silicone, acrylic, polyurethane, poly-epoxide, silyl-terminated polyether, combinations and formulations thereof, and the like. The preferred elastomer 20 for coating laminations 14 for a horizontal deck application where vehicular traffic is expected is PECORA 301 (available from Pecora Corporation, Harleysville, Pa.) or DOW 888 (available from Dow Corning Corporation, Midland, Mich.), both of which are traffic grade rated silicone pavement sealants. For vertical wall applications, the preferred elastomer 20 for coating the laminations 14 is DOW 790 (available from Dow Corning Corporation, Midland, Mich.), DOW 795 (also available from Dow Corning Corporation), or PECORA 890 (available from Pecora Corporation, Harleysville, Pa.). A primer may be used depending on the nature of the adhesive characteristics of the elastomer 20.

During or after application of the elastomer 20 to the laminations 14, the elastomer is tooled or otherwise configured to create a "bellows," "bullet," or other suitable profile such that the vertical expansion joint system 10 can be compressed in a uniform and aesthetic fashion while being maintained in a virtually tensionless environment. The elastomer 20 is then allowed to cure while being maintained in this position, securely bonding it to the infused foam lamination 14.

Figure 4:
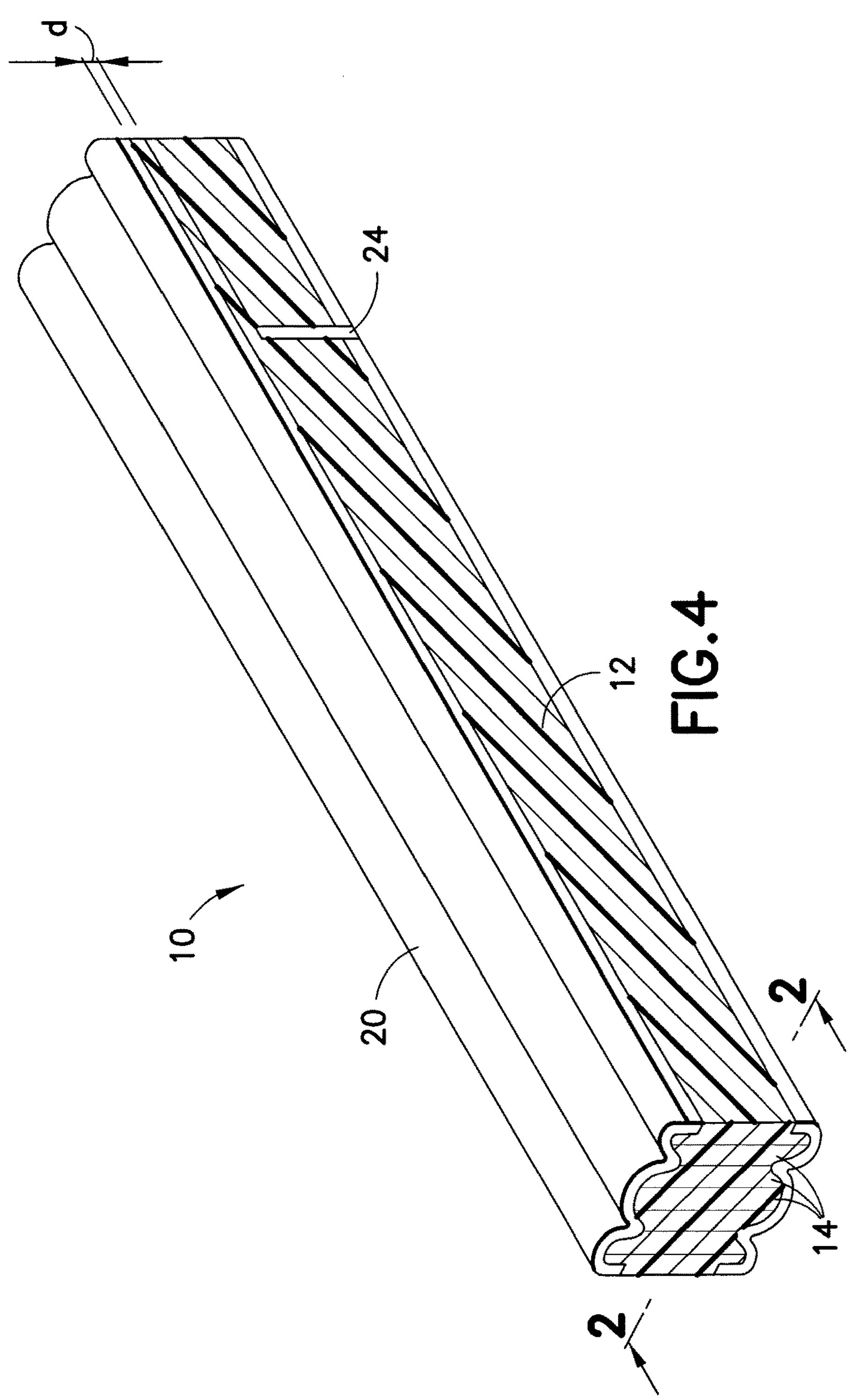
FIG. 4 is a perspective view of an assembly of foam laminations being prepared to produce the vertical expansion joint system of FIG. 1.
Figure 5:
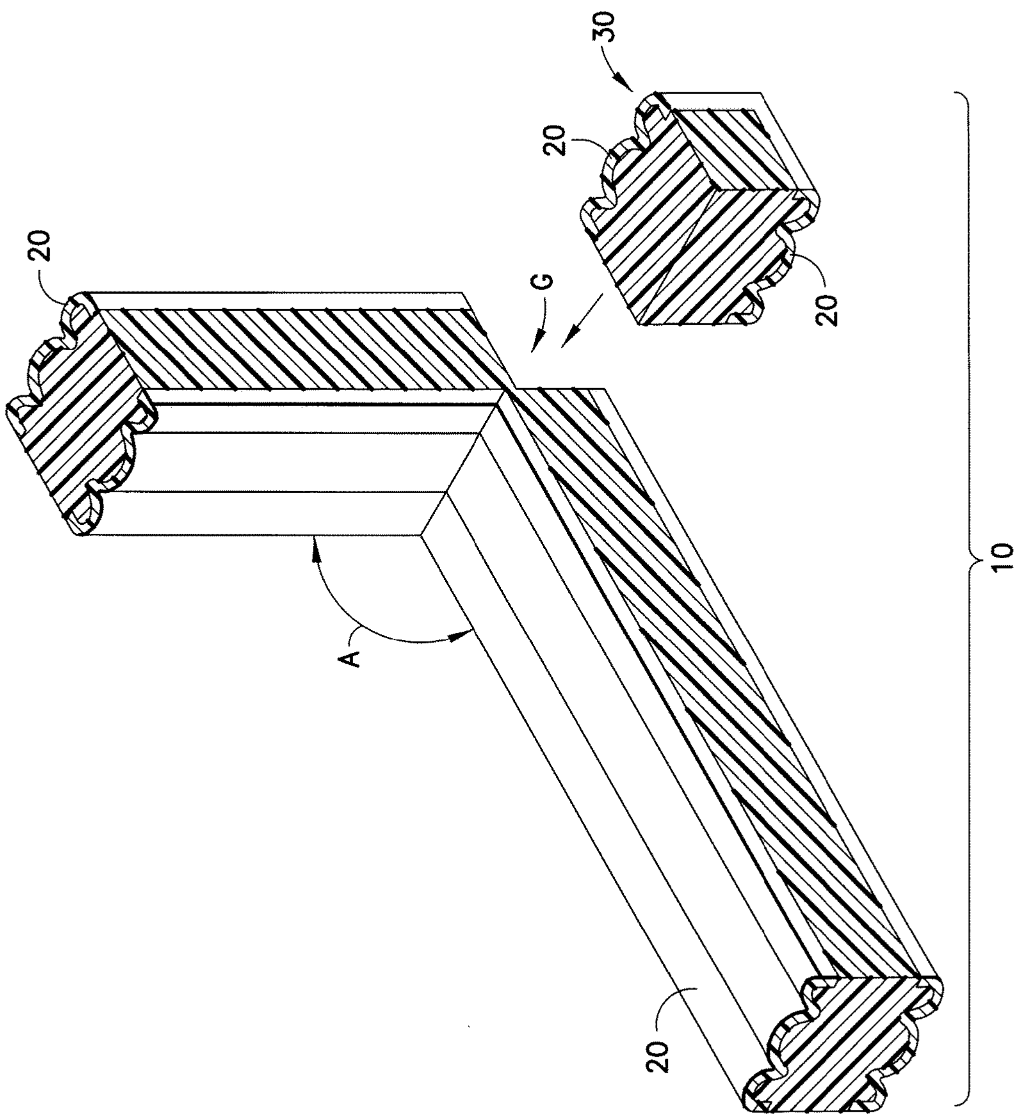
FIG. 5 is a perspective view of the assembly of foam laminations being further prepared to produce the vertical expansion joint system of FIG. 1.

Referring now to FIGS. 4 and 5, when the elastomer 20 has cured in place, the infused foam lamination 14 is cut in a location at which a bend in the vertical expansion system 10 is desired to accommodate a corner. The cut, which is designated by the reference number 24 and as shown in FIG. 4, is made from the outside of the desired location of the bend to the inside of the desired location of the bend using a saw or any other suitable device. The cut 24 is stopped such that a distance d is defined from the termination of the cut to the previously applied coating of the elastomer 20 on the inside of the desired location of the bend (e.g., approximately one half inch from the previously applied coating of elastomer 20 on the inside of the bend). Referring now to FIG. 5, the lamination 14 is then bent to an appropriate angle A, thereby forming a gap G at the outside of the bend.

Although a gap of 90 degrees is shown in FIG. 5, the present invention is not limited in this regard as other angles are possible.

It is also noted that the applied coating of the elastomer 20 may be applied at any desired point in the process, according to embodiments and, e.g., whether a vertical or horizontal expansion joint system. For example, the elastomer 20 may form a continuous coating applied after insertion of an uncoated insert piece 30, as further described below.

Additionally, it is noted that embodiments of the invention could also be made from, e.g., a solid sheet of block foam 12 and so forth) by cutting, stamping, molding, and/or die-cutting the foam to the desired angle before coating.

Still referring to FIG. 5, a piece of infused foam lamination constructed in a manner similar to that described above is inserted into the gap G as an insert piece 30 and held in place by the application of a similar coating of elastomer 20 as described above. In the alternative, the insert piece 30 may be held in place using a suitable adhesive, and thus may be uncoated by the elastomer 20. Accordingly, the angle A around the corner is made continuous via the insertion of the insert piece 30 located between a section of the open celled foam extending in the horizontal plane and a section of the open celled foam extending in the vertical plane. Once the gap has been filled and the insert piece 30 is securely in position, the entire vertical expansion system 10 including the insert piece 30 is inserted into a similar coating fixture with the previously applied elastomer 20 coated side facing down and the uncoated side facing upwards. The uncoated side is now coated with the same (or different) elastomer 20 as was used on the opposite face. Again, the elastomer 20 is then allowed to cure in position. Furthermore, the insert piece 30 inserted into the gap is not limited to being a lamination 14, as solid blocks or the like may be used. It is therefore noted that, according to embodiments, the insert piece 30 may be coated on a side with the elastomer 20. However, according to embodiments, the insert piece 30 is not coated with the elastomer 20 (e.g., may be uncoated).

After both sides have cured, the vertical expansion system 10 as the final uninstalled product is removed from the coating fixture and packaged for shipment. In the packaging operation the vertical expansion system 10 is compressed using a hydraulic or mechanical press (or the like) to a size below the nominal size of the expansion joint at the job site. The vertical expansion system 10 is held at this size using a heat shrinkable poly film. The present invention is not limited in this regard, however, as other devices (ties or the like) may be used to hold the vertical expansion system 10 to the desired size.

Figure 6:
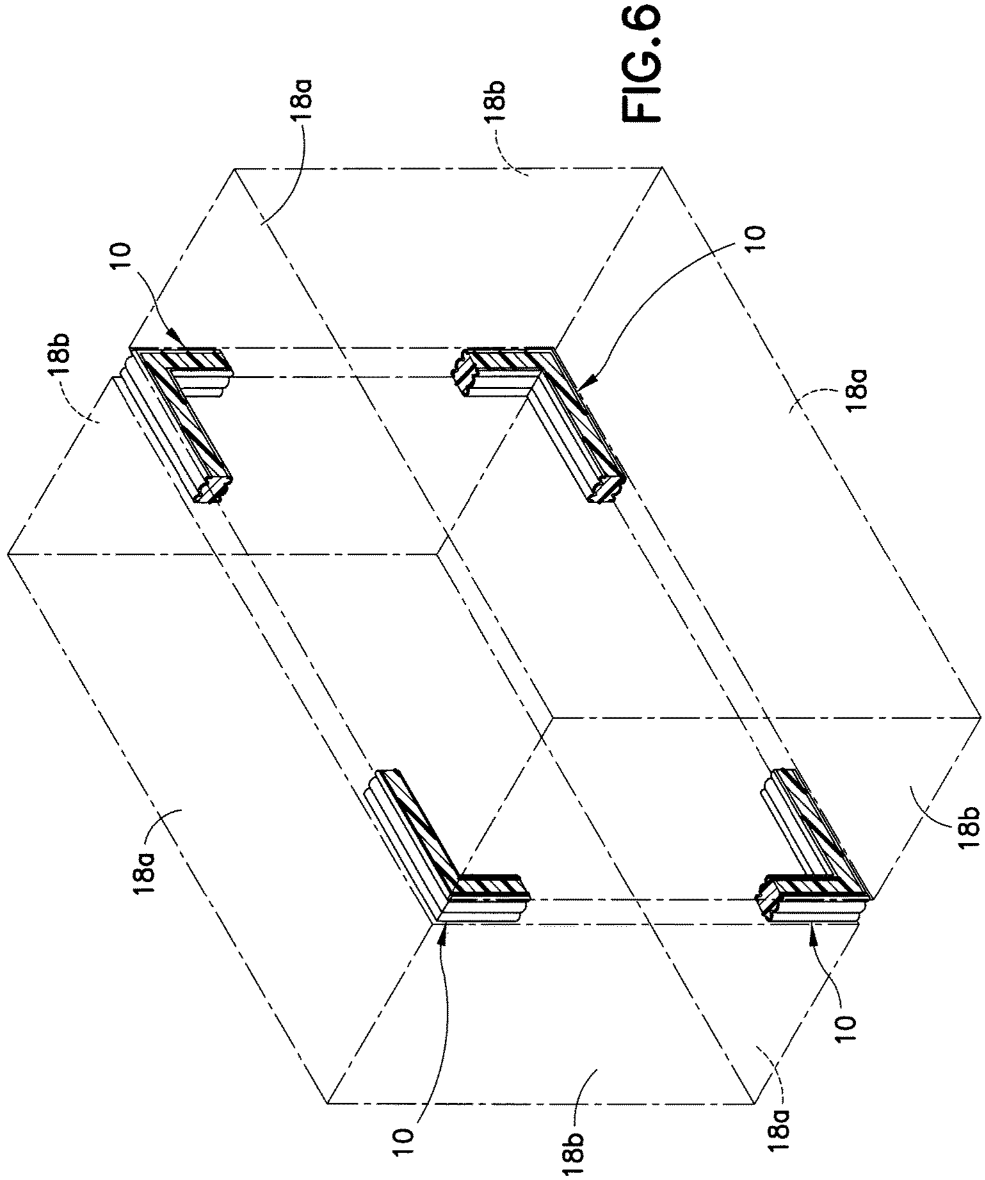
FIG. 6 is a perspective view of four sections of the vertical expansion joint system used in a building structure.

Referring now to FIG. 6, portions of the vertical expansion system 10 positioned to articulate right angle bends are shown as they would be positioned in a concrete expansion joint located in a tunnel, archway, or similar structure. Each portion defines a foam laminate that is positioned in a corner of the joint. As is shown, the vertical expansion joint system 10 is installed between horizontal coplanar substrates 18*a* and vertical coplanar substrates 18*b*.

Figure 7:
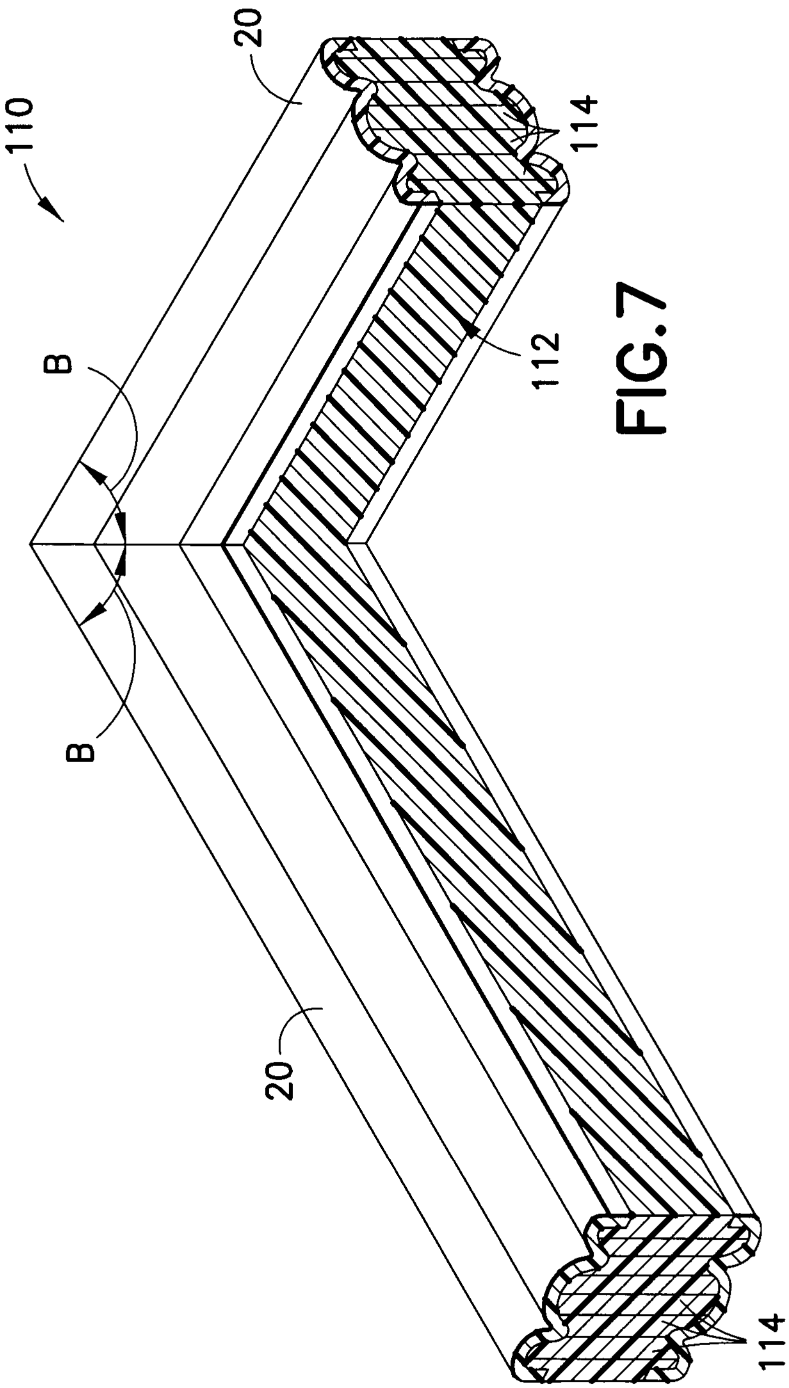
FIG. 7 is a perspective view of a horizontal expansion joint system of the present invention.

Referring now to FIG. 7, an alternate embodiment of the invention is shown. In this embodiment, the infused foam, the elastomer coating on the top surface, and the elastomer coating on the bottom surface are similar to the first embodiment. However, in FIG. 7, the expansion joint system designated generally by the reference number 110 is oriented in the horizontal plane rather than vertical plane and is hereinafter referred to as "horizontal expansion system 110." As with the vertical expansion system 10 described above, the horizontal expansion system 110 may be configured to transition right angles. The horizontal expansion system 110 is not limited to being configured to transition right angles, however, as it can be configured to accommodate any desired angle.

In the horizontal expansion system 110, the infused foam lamination is constructed in a similar fashion to that of the vertical expansion system 10, namely, by constructing a foam 112 assembled from individual laminations 114 of foam material, one or more of which is infused with an acrylic chemistry. Although the horizontal expansion system 110 is described as being fabricated from individual laminations 114, the present invention is not so limited, and other manners of constructing the foam 112 are possible (e.g., solid blocks of foam material).

In fabricating the horizontal expansion system 110, two pieces of the foam 112 are mitered at appropriate angles B (45 degrees is shown in FIG. 7, although other angles are possible). An elastomer, or other suitable adhesive, is applied to the mitered faces of the infused foam laminations. The individual laminations are then pushed together and held in place in a coating fixture at a width slightly greater than the largest joint movement anticipated. At this width the top is coated with an elastomer 20 and cured. Following this, the foam 112 is inverted and then the opposite side is likewise coated.

After both coatings of elastomer 20 have cured, the horizontal expansion system 110 is removed from the coating fixture and packaged for shipment. In the packaging operation, the horizontal expansion system 110 is compressed using a hydraulic or mechanical press (or the like) to a size below the nominal size of the expansion joint at the job site. The product is held at this size using a heat shrinkable poly film (or any other suitable device).

In the horizontal expansion system 110, the installation thereof is accomplished by adhering the foam 112 to a substrate (e.g., concrete, glass, wood, stone, metal, or the like) using an adhesive such as epoxy. The epoxy or other adhesive is applied to the faces of the horizontal expansion system 110 prior to removing the horizontal expansion system from the packaging restraints thereof. Once the packaging has been removed, the horizontal expansion system 110 will begin to expand, and the horizontal expansion system is inserted into the joint in the desired orientation. Once the horizontal expansion system 110 has expanded to suit the expansion joint, it will become locked in by the combination of the foam back pressure and the adhesive.

In any system of the present invention, but particularly with regard to the vertical expansion system 10, an adhesive may be pre-applied to the foam lamination. In this case, for installation, the foam lamination is removed from the packaging and simply inserted into the expansion joint where it is allowed to expand to meet the concrete (or other) substrate. Once this is done, the adhesive in combination with the back pressure of the foam will hold the foam in position.

The vertical expansion system 10 is generally used where there are vertical plane transitions in the expansion joint. For example, vertical plane transitions can occur where an expansion joint traverses a parking deck and then meets a sidewalk followed by a parapet wall. The expansion joint cuts through both the sidewalk and the parapet wall. In situations of this type, the vertical expansion system 10 also transitions from the parking deck (horizontally) to the curb (vertical), to the sidewalk (horizontal), and then from the sidewalk to the parapet (vertical) and in most cases across the parapet wall (horizontal) and down the other side of the parapet wall (vertical). Prior to the present invention, this would result in an installer having to fabricate most or all of these transitions on site using straight pieces. This process was difficult, time consuming, and error prone, and often resulted in waste and sometimes in sub-standard transitions.

In one example of installing the vertical expansion system 10 in a structure having a sidewalk and a parapet, the installer uses several individual sections, each section being configured to transition an angle. The installer uses the straight run of expansion joint product, stopping within about 12 inches of the transition, then installs one section of the vertical expansion system 10 with legs measuring about 12 inches by about 6 inches. If desired, the installer trims the legs of the vertical expansion system 10 to accommodate the straight run and the height of the sidewalk. Standard product is then installed across the sidewalk, stopping short of the transition to the parapet wall. Here another section of the vertical expansion system 10 is installed, which will take the product up the wall. Two further sections of the vertical expansion system 10 are used at the top inside and top outside corners of the parapet wall. The sections of the vertical expansion system 10 are adhered to each other and to the straight run expansion joint product in a similar fashion as the straight run product is adhered to itself. In this manner, the vertical expansion system 10 can be easily installed if the installer has been trained to install the standard straight run product. It should be noted, however, that the present invention is not limited to the installation of product in any particular sequence as the pieces can be installed in any suitable and/or desired order.

In one example of installing the horizontal expansion system 110, the system is installed where there are horizontal plane transitions in the expansion joint. This can happen when the expansion joint encounters obstructions such as supporting columns or walls. The horizontal expansion system 110 is configured to accommodate such obstructions. Prior to the present invention, the installer would have had to create field transitions to follow the expansion joint.

To extend the horizontal expansion system 110 around a typical support column, the installer uses four sections of the horizontal expansion system. A straight run of expansion joint product is installed and stopped approximately 12 inches short of the horizontal transition. The first section of the horizontal expansion system 110 is then installed to change directions, trimming as desired for the specific situation. Three additional sections of horizontal expansion system 110 are then joined, inserting straight run pieces as desired, such that the horizontal expansion system 110 extends around the column continues the straight run expansion joint on the opposite side. As with the vertical expansion system 10, the sections may be installed in any sequence that is desired.

The present invention is not limited to products configured at right angles, as any desired angle can be used for either a horizontal or vertical configuration. Also, the present invention is not limited to foam laminates, as solid foam blocks and the like may alternatively or additionally be used.

Thus, in view of the foregoing, according to embodiments disclosed is a method of making a water resistant expansion joint system, comprising providing foam; forming the foam into a desired shape including an angle by at least one of stamping, cutting, molding and die-cutting; and disposing a layer of an elastomer on the foam. The layer of the elastomer facilitates compression of the water resistant expansion joint system when installed between substrates; and the water resistant expansion joint system accommodates thermal and seismic movement in the system by expanding and contracting, and creates a waterproof seal upon expansion of the foam between the substrates.

A hydrophobic chemistry may be infused into the foam prior to or after forming the foam into the desired shape.

Also according to aspects of the invention, the water resistant expansion joint system, including the layer of elastomer disposed on the foam including the angle, is angled around a corner and accommodates thermal and seismic movement in the system by expanding and contracting, and creates a waterproof seal around the corner upon expansion of the foam between the substrates.

According to further aspects of the invention, disclosed is a method of installing a water resistant expansion joint system. The method comprises providing a foam formed into a desired shape including an angle by at least one of stamping, cutting, molding and die-cutting, and having a layer of an elastomer disposed thereon. The layer of the elastomer facilitates compression of the water resistant expansion joint system when installed between substrates. The method further comprises installing the water resistant expansion joint system between the substrates; wherein the water resistant expansion joint system accommodates thermal and seismic movement in the system by expanding and contracting, and creates a waterproof seal upon expansion of the foam between the substrates.

According to a still further aspect, disclosed is a water resistant expansion joint system, comprising foam, which has been formed into a desired shape by at least one of stamping, cutting, molding and die-cutting; and a layer of an elastomer disposed on the foam. The layer of the elastomer facilitates compression of the water resistant expansion joint system when installed between substrates. The desired shape of the foam includes an angle, and the water resistant expansion joint system is angled around a corner and accommodates thermal and seismic movement in the system by expanding and contracting, and creates a waterproof seal around the corner upon expansion of the foam between the substrates.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A water resistant expansion joint system, comprising:

precompressed foam, which has been formed into a desired shape by at least one of stamping, cutting, molding and die-cutting, the precompressed foam including a first section of precompressed foam extending in a first plane, and a second section of precompressed foam extending in a second plane and forming an angle A therebetween;

a compressible, unitary, continuous layer of an elastomer disposed on the precompressed foam;

wherein the precompressed foam with the compressible, unitary, continuous layer of the elastomer disposed thereon has a homogenous structure that facilitates uniform expansion and compression of the water resistant expansion joint system when installed between substrates; and wherein the water resistant expansion joint system is angled around a corner between the substrates, with the compressible, unitary, continuous layer of the elastomer around the corner, and accommodates thermal and seismic movement in the system by uniformly expanding and contracting while maintaining the continuous layer of elastomer, and creates a waterproof seal around the corner upon uniform expansion of the precompressed foam with the compressible, unitary, continuous layer elastomer thereon, between the substrates, such that the precompressed foam with the compressible, unitary, continuous layer elastomer thereon provides a uniform force to the substrates such that the system becomes locked in place and uniformly expands and contracts around the corner to maintain the waterproof seal and the homogenous structure of the system.

2. The water resistant expansion joint system of claim 1, wherein a hydrophobic chemistry is infused into the foam.

3. The water resistant expansion joint system of claim 2, wherein the hydrophobic chemistry is an acrylic chemistry.

4. The water resistant expansion joint system of claim 1, wherein the angle A is about 90 degrees.

5. The water resistant expansion joint system of claim 1, wherein the first plane and the second plane each extend horizontally.

6. The water resistant expansion joint system of claim 1, wherein the first plane extends horizontally and the second plane extends vertically.

* * * * *